(12) United States Patent
Little et al.

(10) Patent No.: US 11,467,053 B2
(45) Date of Patent: Oct. 11, 2022

(54) TEST DEVICE AND CALIBRATING METHOD

(71) Applicant: GOERTEK INC., Weifang (CN)

(72) Inventors: Richard Warren Little, Weifang (CN);
Tonghai Wu, Weifang (CN); Fengnian Ma, Weifang (CN); Zimin Li, Weifang (CN); Bing Dai, Weifang (CN); Zongxue Tang, Weifang (CN); Chunduo Liu, Weifang (CN); Rui Zhou, Weifang (CN)

(73) Assignee: GOERTEK INC., Weifang (CN)

( * ) Notice: Subject to any disclaimer, the term of this patent is extended or adjusted under 35 U.S.C. 154(b) by 870 days.

(21) Appl. No.: 16/095,368

(22) PCT Filed: May 31, 2018

(86) PCT No.: PCT/CN2018/089299
§ 371 (c)(1),
(2) Date: Oct. 21, 2018

(87) PCT Pub. No.: WO2019/227407
PCT Pub. Date: Dec. 5, 2019

(65) Prior Publication Data
US 2021/0223135 A1    Jul. 22, 2021

(51) Int. Cl.
*G01M 3/00* (2006.01)
*G01M 3/20* (2006.01)

(52) U.S. Cl.
CPC ............ *G01M 3/007* (2013.01); *G01M 3/207* (2013.01)

(58) Field of Classification Search
CPC .............................. G01M 3/007; G01M 3/207
See application file for complete search history.

(56) References Cited

U.S. PATENT DOCUMENTS

| 7,814,773 B2* | 10/2010 | Liu ........................ G01M 3/007 73/1.01 |
| 11,060,944 B2* | 7/2021 | Regef ..................... G01M 3/04 |
| 2005/0081597 A1* | 4/2005 | Hoffmann ............. G01M 3/007 73/1.02 |
| 2006/0196245 A1* | 9/2006 | Liu ........................ G01M 3/007 73/1.06 |
| 2009/0164148 A1 | 6/2009 | Shinoda |

(Continued)

FOREIGN PATENT DOCUMENTS

| CN | 101210856 A * | 7/2008 |
| CN | 102466551 A | 5/2012 |

(Continued)

OTHER PUBLICATIONS

JP-2012103151-English (Year: 2012).*

(Continued)

*Primary Examiner* — Peter J Macchiarolo
*Assistant Examiner* — Fatemeh Esfandiari Nia
(74) *Attorney, Agent, or Firm* — Saliwanchik, Lloyd & Eisenschenk

(57) ABSTRACT

A test device and a calibration method thereof are disclosed. The test device for calibrating a test equipment, which is used to test a waterproof level of an electronic apparatus, comprises: two plates, which are pressed against each other with pressure, wherein minor gap between the two plates are used as water leakage path.

2 Claims, 4 Drawing Sheets

(56) References Cited

U.S. PATENT DOCUMENTS

2017/0097233 A1\* 4/2017 Shuster .................. G01M 3/00
2021/0080341 A1\* 3/2021 Higuchi .............. G01M 3/3254

FOREIGN PATENT DOCUMENTS

| CN | 103926040 | A | \* | 7/2014 | | |
|----|-----------|---|---|--------|---|---|
| CN | 104792473 | A | | 7/2015 | | |
| CN | 205027648 | U | | 2/2016 | | |
| CN | 106969884 | A | | 7/2017 | | |
| CN | 106969884 | A | \* | 7/2017 | .............. | G01M 3/04 |
| CN | 208273247 | U | \* | 12/2018 | | |
| CN | 108358580 | B | \* | 11/2019 | ........... | C04B 28/144 |
| CN | 211651945 | U | \* | 10/2020 | | |
| JP | 2008203107 | A | \* | 9/2008 | | |
| JP | 2012103151 | A | \* | 5/2012 | | |
| JP | 5890597 | B1 | \* | 3/2016 | ......... | G01N 15/0806 |

OTHER PUBLICATIONS

CN-103926040-english (Year: 2006).\*
JP-2008203107-English (Year: 2008).\*
JP-5890597-B1 (Year: 2016).\*
CN-106969884-eng (Year: 2006).\*
CN-101210856-A-eng (Year: 2006).\*

\* cited by examiner

TEST DEVICE AND CALIBRATING METHOD

CROSS REFERENCE TO RELATED APPLICATIONS

This application is a National Stage of International Application No. PCT/CN2018/089299, filed on May 31, 2018, which is hereby incorporated by reference in its entirety.

FIELD OF THE INVENTION

The present invention relates to the technical field of testing a waterproof level of an electronic apparatus, and more specifically, to a test device for calibrating a test equipment and a method for calibrating a test equipment under calibration.

BACKGROUND OF THE INVENTION

Waterproof is becoming an important characteristic of an electronic apparatus such as a smart watch, a smart phone and so on. Generally, an electronic apparatus is tested in a test equipment to determine its water proof level. The water proof level may be indicated by the water leakage value obtained by the test equipment.

In the waterproof test or leakage test, test equipments from different vendors may be used. For example, both test equipments form company A and company B may be used in testing the waterproof level of an electronic apparatus. If the test equipment from company A is deemed as a standard test equipment, then the equipment from company B may have a different performance and thus have a different testing criteria. In such a situation, it is difficult to determine whether the result of the equipment from company B is accurate and whether testing results from the two equipments are consistent.

Since the performances of different device under test may vary, the same device under test is used to be tested in the two equipments in the prior art. Results from the two equipments are obtained to determine the difference between them and to calibrate the two equipments. However, the same device under test will repetitively experience high water-pressure during calibration, which will result in a variation of the leakage performance of the device. As such, the calibration of the two equipments will not be accurate.

Therefore, there is a demand in the art that a new solution for calibrating a test equipment shall be proposed to address at least one of the problems in the prior art.

SUMMARY OF THE INVENTION

One object of this invention is to provide a new technical solution for calibrating a test equipment.

According to a first aspect of the present invention, there is provided a test device for calibrating a test equipment, which is used to test a waterproof level of an electronic apparatus, comprising: two plates, which are pressed against each other with pressure, wherein minor gap between the two plates are used as water leakage path.

Preferably, the plates are metal plates.

Preferably, the waterproof level of the test device is adjusted by changing the roughness of surfaces between the two plates.

Preferably, a layer of waterproof mesh is sandwiched between two adjacent plates, and the roughness of surfaces is at least partly defined by the layer of waterproof mesh.

Preferably, the waterproof level of the test device adjusted by changing the pressure applied on the two plates.

Preferably, the waterproof level of the test device adjusted by changing the length along the leakage path.

Preferably, the waterproof level is a water leakage value.

According to a second aspect of the present invention, there is provided a method for calibrating a test equipment under calibration, which is used to test a waterproof level of an electronic apparatus, comprising: testing a test device according to this disclosure by using a standard test equipment to obtain a standard waterproof level value; testing the same test device by using the test equipment under calibration to obtain a calibration waterproof level value; and calibrating the test equipment under calibration by using the difference between the standard waterproof level value and the calibration waterproof level value.

Preferably, the method further comprises: performing the testing and calibrating processes by using a test device according to this disclosure with at least one changed attribute selected from a group including thickness and material of the waterproof mesh, sizes of the holes and the number of the layers of waterproof meshes and the number of the plates.

According to an embodiment of this disclosure, a test device is provided so that the calibration of a test equipment will be more accurate.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
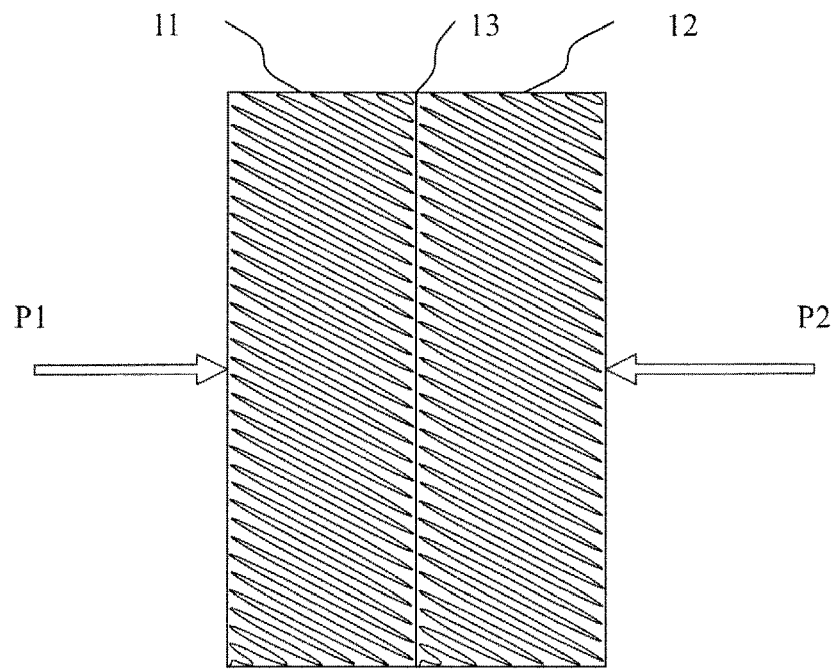
FIG. 1 is a schematic diagram showing a test device according to a first embodiment of this disclosure.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

In order to test the waterproof ability of an electronic apparatus, the electronic apparatus may be placed in an environment with high water pressure. The electronic apparatus may be a smart phone, a smart watch or a transducer such as a microphone unit. For example, this may simulate the situation where a smart watch is placed at 50 meters under water. Generally, a test equipment is used to test the electronic apparatus by sensing the leakage thereof.

If a new test equipment is to be used or is developed, its scales may deviate from a standard one. So, we propose that the test equipment under development or supplied by a different vendor shall be calibrated with the standard one.

In the calibration, a standard test device is tested in the standard equipment and a standard leakage value is obtained. Then, the standard test device is tested in the test equipment under calibration and a calibration leakage value is obtained. Ideally, the calibration leakage value should be identical with the standard one. But, in practice, they will have difference. The difference is used to adjust the test equipment under calibration to approach the scales or values of the standard one.

The test device is a key issue for calibrating the test equipment. If a product to be tested is used as the test device, it has several disadvantages. First, the cost may be an issue. Second, its performance may vary. For example, after being tested in a high water pressure, the mesh of the product may be changed (enlarged), which leads to an un-constant result. Third, it is usually difficult to adjust the water leakage of a product and thus it is difficult to calibrate the test equipment under calibration in several levels by using the same product.

Here, we propose that they shall be calibrated before being used. The test device for calibration is proposed here, which can create a very small leakage which is controllable and durable and which is cost efficient and simple to manufacture.

FIG. 1 shows a schematic diagram of a test device according to a first embodiment of this disclosure.

As shown in FIG. 1, the test device comprises two plates 11, 12. The two plates 11, 12 are pressed against each other with pressure indicated by P1, P2. Here, minor gap between the two plates 11, 12 are used as water leakage path 13.

Figure 2:
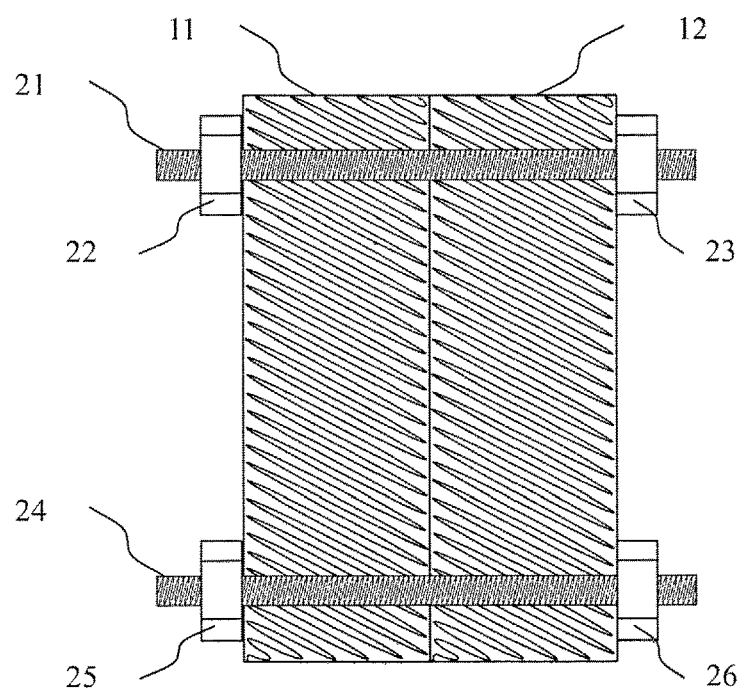
FIG. 2 is a schematic diagram showing a test device according to a second embodiment of this disclosure.

The pressure P1, P2 can be applied by using clamps or bolts. FIG. 2 shows an embodiment in which the plates 11, 12 are pressed by using bolts. As shown in FIG. 2, the bolts 21, 24 and the nuts 22, 23, 25, 26 are used to apply pressure on the plates 11, 12. For example, the waterproof level of the test device adjusted by changing the pressure P1, P2 applied on the two plates 11, 12.

The test device can be used for calibrating a test equipment. As explained above, the test equipment is used to test a waterproof level of an electronic apparatus. The waterproof level may be a value indicating the range of the water leakage value of a device or may be a water leakage value per se.

The plates 11, 12 may be metal plates, such as aluminum plates. Alternatively, it may be resin sheet.

Figure 3:
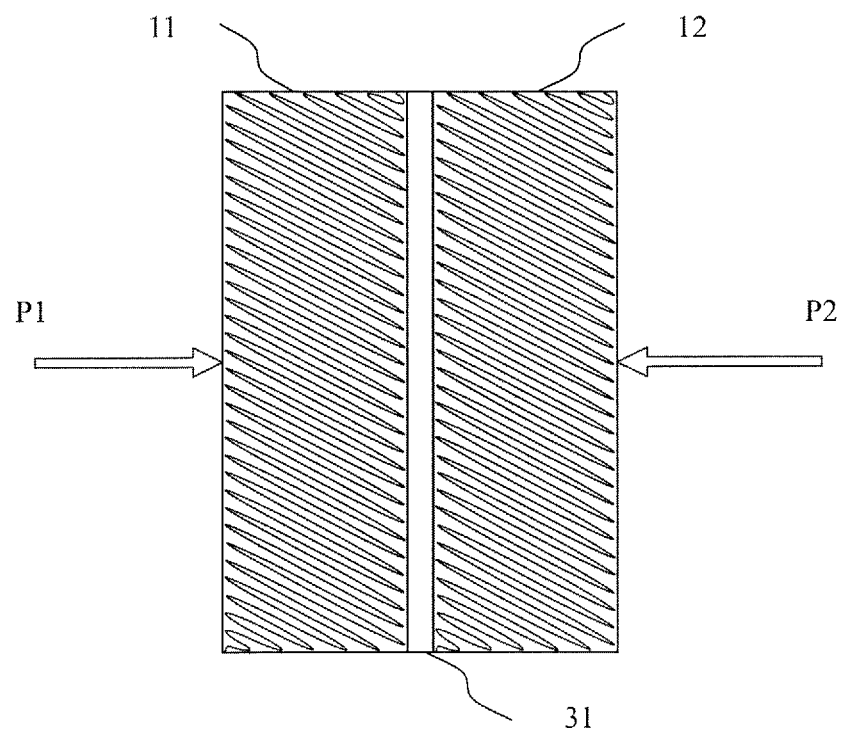
FIG. 3 is a schematic diagram showing a test device according to a third embodiment of this disclosure.
Figure 4:
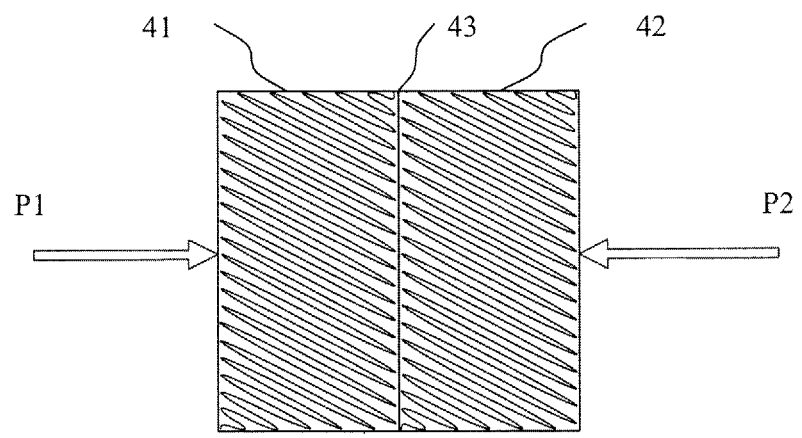
FIG. 4 is a schematic diagram showing a test device according to a fourth embodiment of this disclosure.

FIGS. 3-4 show several embodiments of changed water leakages of the test device. The repetitive description of already explained elements is omitted.

The waterproof level of the test device is adjusted by changing the roughness of surfaces between the two plates. For example, as shown in FIG. 3, a layer of waterproof mesh 31 may be sandwiched between two adjacent plates, and the roughness of surfaces is at least partly defined by the layer of waterproof mesh. For example, it can be defined by the thickness, the material and/or the surface roughness of the waterproof mesh. The waterproof mesh may be that available on the market, which is waterproof and is used to protect an device from water or humidity.

The waterproof level of the test device adjusted by changing the length along the leakage path. As shown in FIG. 4, the plates 41, 42 are shorter than those in FIG. 1. So, the length of the leakage path 43 is shorter than that in FIG. 1, too.

In this disclosure, the test device is simple and easy to manufacture. It can provide a stable performance during test. The water leakage thereof can be adjusted conveniently.

Figure 5:
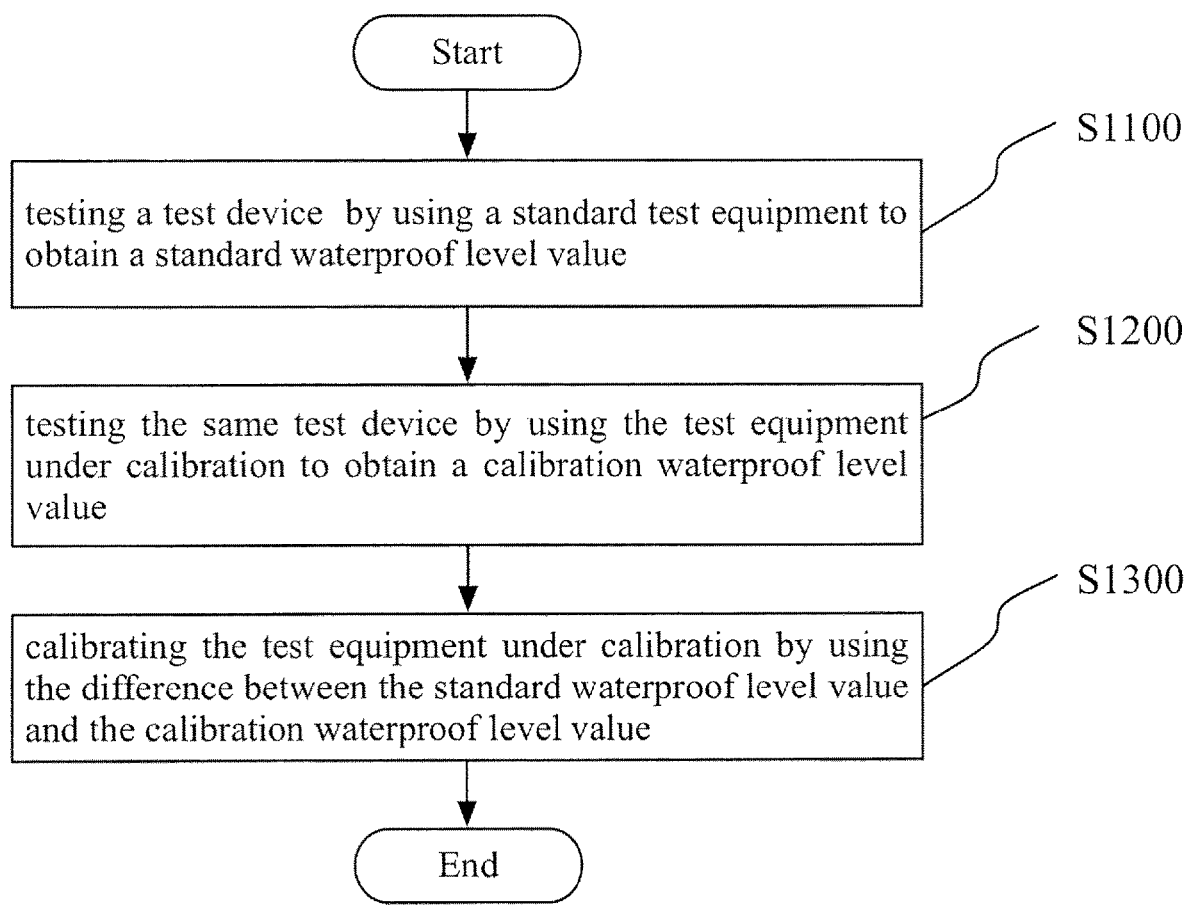
FIG. 5 is an exemplary flow chart diagram a method for calibrating a test equipment under calibration according to an embodiment of this disclosure.

FIG. 5 is an exemplary flow chart diagram a method for calibrating a test equipment under calibration according to an embodiment of this disclosure. The test equipment under calibration is used to test a waterproof level of an electronic apparatus.

As shown in FIG. 5, at step S1100, a test device as described above is test by using a standard test equipment to obtain a standard waterproof level value.

Figure 6:
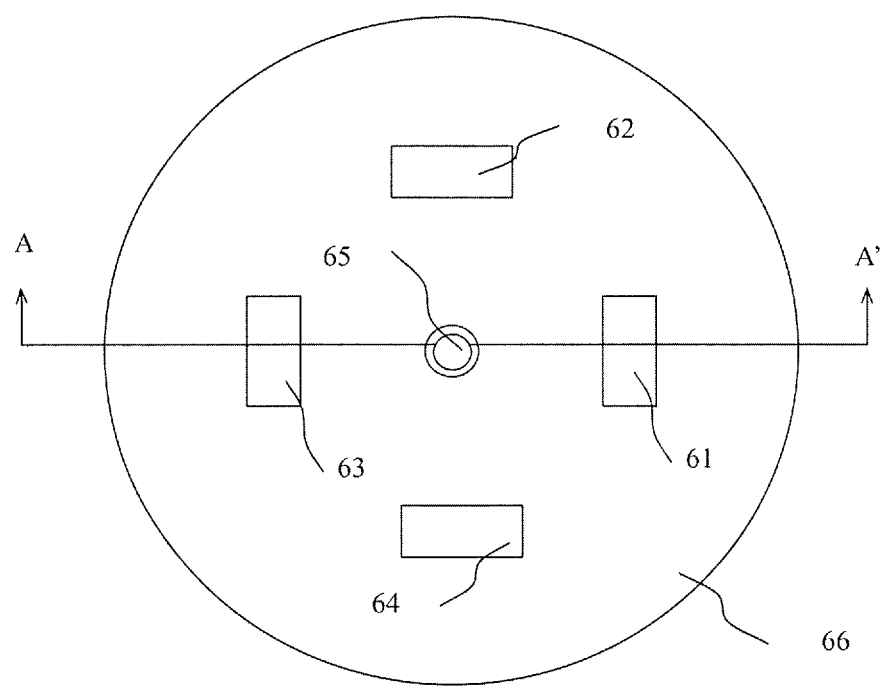
FIG. 6 shows an example of testing an test device in a test equipment.
Figure 7:
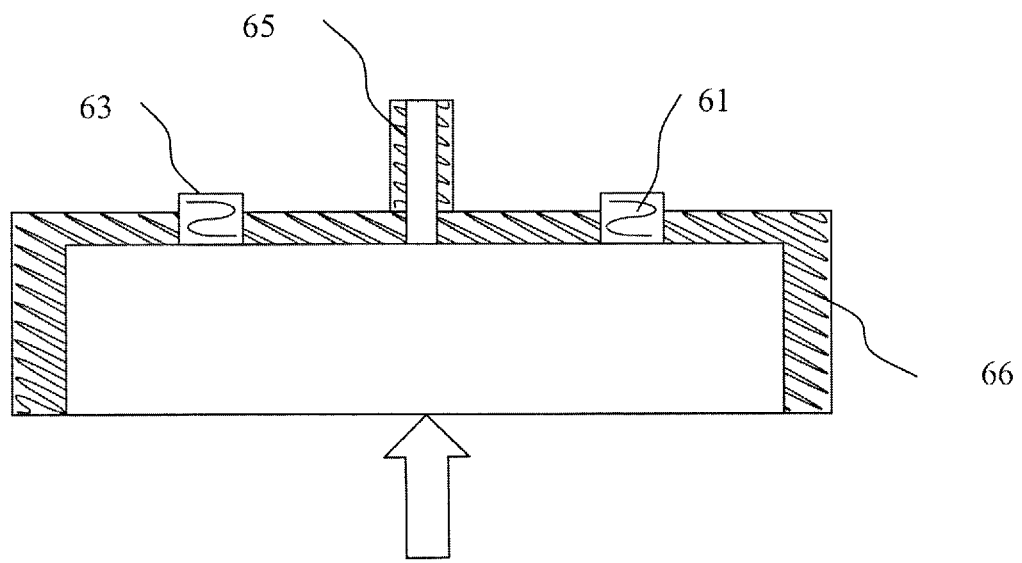
FIG. 7 shows the cross-section view along the line A-A' of FIG. 7.

FIG. 6 shows an example of testing an test device in a test equipment. FIG. 7 shows the cross-section view along the line A-A' of FIG. 6. The arrangement of the standard test equipment may be that shown in FIGS. 6, 7.

As shown in FIG. 6, the test device may be placed in the test positions 61, 62, 63, 64 of a base 66 of the standard test equipment. A plurality of test devices may be used in the testing. The base 66 may include a water outlet 65, which can be used to control the water pressure of testing.

As shown in FIG. 7, the test devices are placed in the test positions 61, 63 with inlets towards down and outlets towards up. The pressurized water comes along the direction indicated by the arrow. A sensor (not shown) is provided above the test devices to sensor the water leakage or humidity above the test devices (or the base 66) to obtain a standard waterproof level value.

At step S1200, the same test device is tested by using the test equipment under calibration to obtain a calibration waterproof level value.

The arrangement of the test equipment under calibration may also be that shown in FIG. 7.

At step S1300, the test equipment under calibration is calibrated by using the difference between the standard waterproof level value and the calibration waterproof level value. For example, the scale of the test equipment under calibration may be adjusted by adding the difference.

In some situation, the testing and calibrating processes may be performed by using a test device as described above with at least one changed attribute selected from a group including thickness and material of the waterproof mesh, sizes of the holes and the number of the layers of waterproof meshes and the number of the plates. In such a situation, the calibration may be more accurate.

Although some specific embodiments of the present invention have been demonstrated in detail with examples, it should be understood by a person skilled in the art that the above examples are only intended to be illustrative but not to limit the scope of the present invention.

What is claimed is:

1. A method for calibrating a test equipment under calibration, which is used to test a waterproof level of an electronic apparatus, the method comprising:
testing a test device by using a standard test equipment to obtain a standard waterproof level value using a first sensor, wherein the test device comprises two plates which are pressed against each other with pressure, and is placed in a test position of a base of the standard test equipment when calibrating the standard test equipment, and wherein a minor gap between the two plates is used as a water leakage path;
testing the same test device by using the test equipment under calibration to obtain a calibration waterproof level value using a second sensor, wherein the test device is placed in the test position of the base of the test equipment under calibration when calibrating the test equipment under calibration; and
calibrating the test equipment under calibration by using the difference between the standard waterproof level value and the calibration waterproof level value.

2. The method according to claim 1, further comprising:
performing the testing and calibrating processes by using the test device with at least one changed attribute selected from a group including the roughness of surfaces between the two plates, the pressure applied on the two plates the length along the leakage path.

* * * * *